United States Patent
Ebihara et al.

(10) Patent No.: US 6,806,613 B2
(45) Date of Patent: Oct. 19, 2004

(54) COMMUTATOR INTEGRATED ARMATURE OF ELECTRIC ROTARY MACHINE

(75) Inventors: Jiro Ebihara, Nukata-gun (JP); Kenichi Shibayama, Anjo (JP); Masami Niimi, Handa (JP); Osamu Ina, Anjo (JP)

(73) Assignee: Denso Corporation, Kariya (JP)

( * ) Notice: Subject to any disclaimer, the term of this patent is extended or adjusted under 35 U.S.C. 154(b) by 471 days.

(21) Appl. No.: 09/803,979

(22) Filed: Mar. 13, 2001

(65) Prior Publication Data

US 2001/0022481 A1 Sep. 20, 2001

(30) Foreign Application Priority Data

Mar. 14, 2000 (JP) .......................... 2000-70688

(51) Int. Cl.[7] .......................... H02K 3/48; H02K 1/22; H02K 3/46; H02K 15/00
(52) U.S. Cl. .......................... 310/214; 310/42; 310/264; 310/270
(58) Field of Search ................. 310/214, 233, 310/42, 269, 264, 261, 270; 29/598

(56) References Cited

U.S. PATENT DOCUMENTS

| 4,433,262 A | * | 2/1984 | Greenlee ................. 310/214 |
| 4,616,151 A | * | 10/1986 | Pryjmak ................. 310/216 |
| 4,896,066 A | * | 1/1990 | Tomite ................. 310/214 |
| 5,508,577 A | * | 4/1996 | Shiga et al. ................. 310/91 |
| 5,650,683 A | * | 7/1997 | Shiga et al. ................. 310/201 |
| 5,739,617 A | | 4/1998 | Katoh et al. |
| 6,018,209 A | | 1/2000 | Katoh et al. |

FOREIGN PATENT DOCUMENTS

| DE | 2627647 A1 | | 1/1977 | |
| DE | 2848618 A1 | | 5/1980 | |
| DE | 3230296 A1 | | 2/1984 | |
| DE | 19521669 A1 | * | 1/1996 | ............ G05F/1/56 |
| EP | 297278 A2 | * | 1/1989 | ............ H02K/3/487 |
| EP | 863600 A2 | * | 9/1998 | ............ H02K/1/24 |
| JP | 62247736 A | * | 10/1987 | ............ H02K/3/48 |
| WO | WO 9835422 A1 | * | 8/1998 | ............ H02K/3/487 |

* cited by examiner

Primary Examiner—Karl Tamai
Assistant Examiner—J. Aguirrechea
(74) Attorney, Agent, or Firm—Oliff & Berridge, PLC

(57) ABSTRACT

A commutator-integrated armature of a rotary electric machine is comprised of a rotary shaft, an armature core composed of a plurality of laminated sheets, an armature coil composed of a plurality of conductor segments. The conductor segments have in-slot portions respectively inserted into a plurality of slots of the armature core and end portions forming a flat commutator. The armature core has an anchoring portion for anchoring a part of each of the in-slot portions to the armature core more strongly than the rest thereof. The surface of the flat commutator is maintained flat even if the conductor segments repeat thermal expansion and contraction.

5 Claims, 2 Drawing Sheets

COMMUTATOR INTEGRATED ARMATURE OF ELECTRIC ROTARY MACHINE

CROSS REFERENCE TO RELATED APPLICATION

The present application is based on and claims priority from Japanese Patent Application 2000-70688 filed Mar. 14, 2000, the contents of which are incorporated herein by reference.

BACKGROUND OF THE INVENTION

1. Field of the Invention

The present invention relates to a rotary electric machine and, particularly, an armature having an integrated commutator at an end thereof.

2. Description of the Related Art

U.S. Pat. No. 5,739,617 or its corresponding Japanese Patent Application JP-A-9-51645 discloses an armature of a rotary electric machine. The armature has an integrated commutator at an end of an armature coil. Upper-layer conductor segments and a generally disk-like insulation spacer, which is made of a hard resinous material, are fitted to each other on the end of the armature adjacent a commutator so that axial position of the upper-layer conductor segments can be fixed. Therefore, the commutator surface in contact with the brush can be maintained flat.

Although the commutator surface of the armature can be maintained flat to a certain extent by the insulation spacer, there is still considerable unevenness on the surface. For example, the commutator surface of an armature of a small starter motor for a vehicle, which has 50 mm in diameter and 30 mm in length, had about 20 $\mu$m difference in height thereon after a starting operation was repeated. It is noted that the difference in height of the commutator surface was measured after the starter motor had been tested and disassembled. That is, more difference in height should have been measured if the difference was measured while the starter motor was operating.

If there is a certain large difference in height on the commutator surface 31a, the brush may wear away. As a result, the lifetime of the brush shortens, and electric resistance loss between the commutator and the brush increases.

SUMMARY OF THE INVENTION

Therefore, the present invention is to provide an armature that has more flat commutator surface.

If upper layer conductor segments are heated in a short time and the temperature thereof rises sharply, difference in thermal expansion are generated between the upper-layer conductor segment and the armature core. In addition, the following fact was found: the upper-layer conductor segments, which form the commutator, expand and slide on the armature core due to the thermal expansion. If the upper-layer conductor segments expand uniformly, there is no difference in height on the commutator surface. The difference in height on the commutator surface is generated if the upper-layer conductor segments expand diversely, thereby causing the upper-layer conductor segments to shift diversely. Because the pressure is uniformly applied on the upper-layer conductor segments to retain in the slots of the armature core in the axial direction, positions of the upper-layer conductor segments when thermally expanding may be different from positions there of when thermally contracting. In other words, each upper-layer conductor segment moves like an earthworm on the armature core every time it thermally expands and contracts, or shifts as a result of repeated random motions in a certain distance.

According to a main feature of the invention in order to prevent the above shifts, an armature core has an anchoring portion, disposed near the commutator, for anchoring a part of each the conductor segment more strongly than the rest thereof.

Because a part of each conductor segment is tightly fixed to the anchoring portion, there is no shift of each conductor segment at the anchoring portion relative to the armature core even if each conductor segment thermally expands or contracts. Even if the conductor segments repeats thermal expansion and thermal contraction while the rotary electric machine is operating, the anchored parts of the conductor segments relative to the armature core do not shift. Accordingly, even if the rotary electric machine operates for a long time, there is no height difference on the commutator segment of the armature.

As a result, the lifetime of the brushes is increased and the service cost thereof is reduced. In addition, the connection resistance between the commutator and the brushes is reduced, thereby improving the performance of the rotary electric machine.

Each anchored part of the conductor segment is preferably fixed to the armature core at a distance from the commutator as short as possible. If the distance is not short enough, there is some possibility of the height difference on the commutator surface due to irregular friction and others generated between the armature core and the conductor segments. However, it may be disposed at a distance less than a half of the length of the armature core from the end thereof adjacent to the commutator.

On the other hand, the anchoring portion may be disposed at a space corresponding to one of the laminated sheets of the armature core. If the anchoring portion is disposed at the extreme end of the armature core adjacent to the commutator, there is some possibility of inconvenience. For example, if the anchoring portion is formed by pressing the outer periphery of the armature core, insulation paper sheets that insulate the conductor segments may be broken because a large centrifugal force of the commutator is applied to the anchoring portion. In order to avoid the above problem, the anchoring portion is formed at not the extreme end of the armature core but at least a pace of the laminated sheet from the end.

The anchoring portion can be formed very easily by a roller. The roller is pressed against the outer periphery of the armature core while the armature is being turned.

Preferably, the pressed portion has an outside diameter 0.08%–0.6% less than the outside diameter of other portion of the armature core. Therefore, the pressed portion can be formed without severe accuracy of the size, so that the production cost of the armature can be maintained at a low level.

If the outside diameter of the pressed portion is not 0.08%–0.6% less than the outside diameter of other portions of the armature core, the depth of the pressing is not sufficient. In other words, the pressed depth is so small that the pressed portion is not so strong to provide the pressing force at the pressed portion. If the outside diameter of the pressed portion is 0.6% smaller than the other portions of the armature core, the pressed portion sinks too deep, and insulation paper sheets are broken at the pressed portion.

Because the pressed portion is formed at the step of applying a stepped punch on the outer periphery of the armature core that is the last step in manufacturing process of the armature, the pressed portion can be formed easily at a low cost. Almost the all parts except the spacer are well known and almost all the steps except the pressing step for forming the pressed portion 22 are well known. As a result, the production cost does not increase very much.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
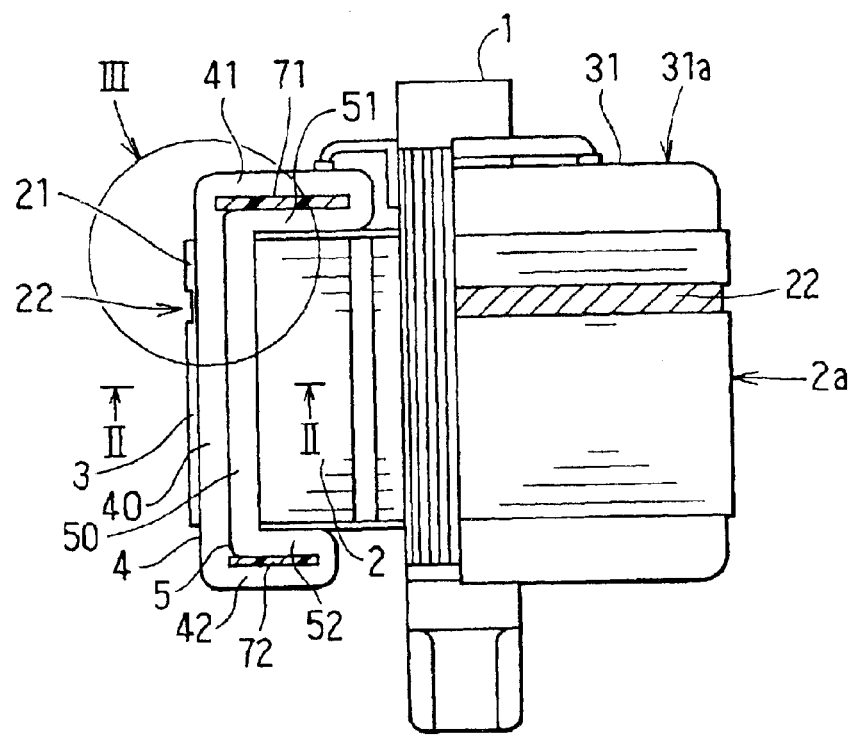
FIG. 1 is a half cross-sectional view illustrating an armature according to a first embodiment of the invention.

An armature according to a first embodiment of the invention is described with reference to the appended drawings. As shown in FIG. 1, the armature includes a rotary shaft 1, an armature core 2, and an armature coil 3 that is comprised of a plurality of upper conductor segments 4 and a plurality of lower conductor segments 5.

Figure 2:
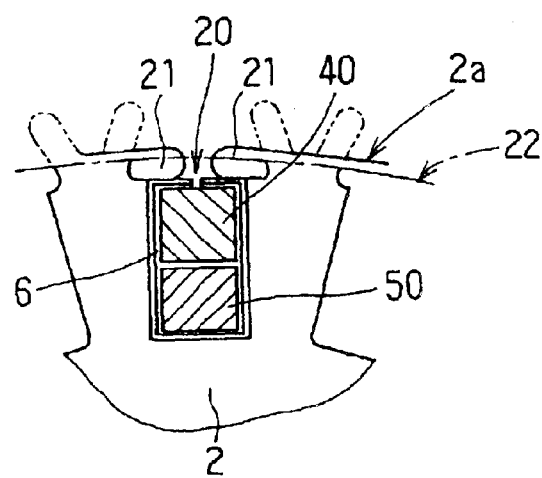
FIG. 2 is a cross-sectional view illustrating portions around a slot of the armature according to the first embodiment.
Figure 3:
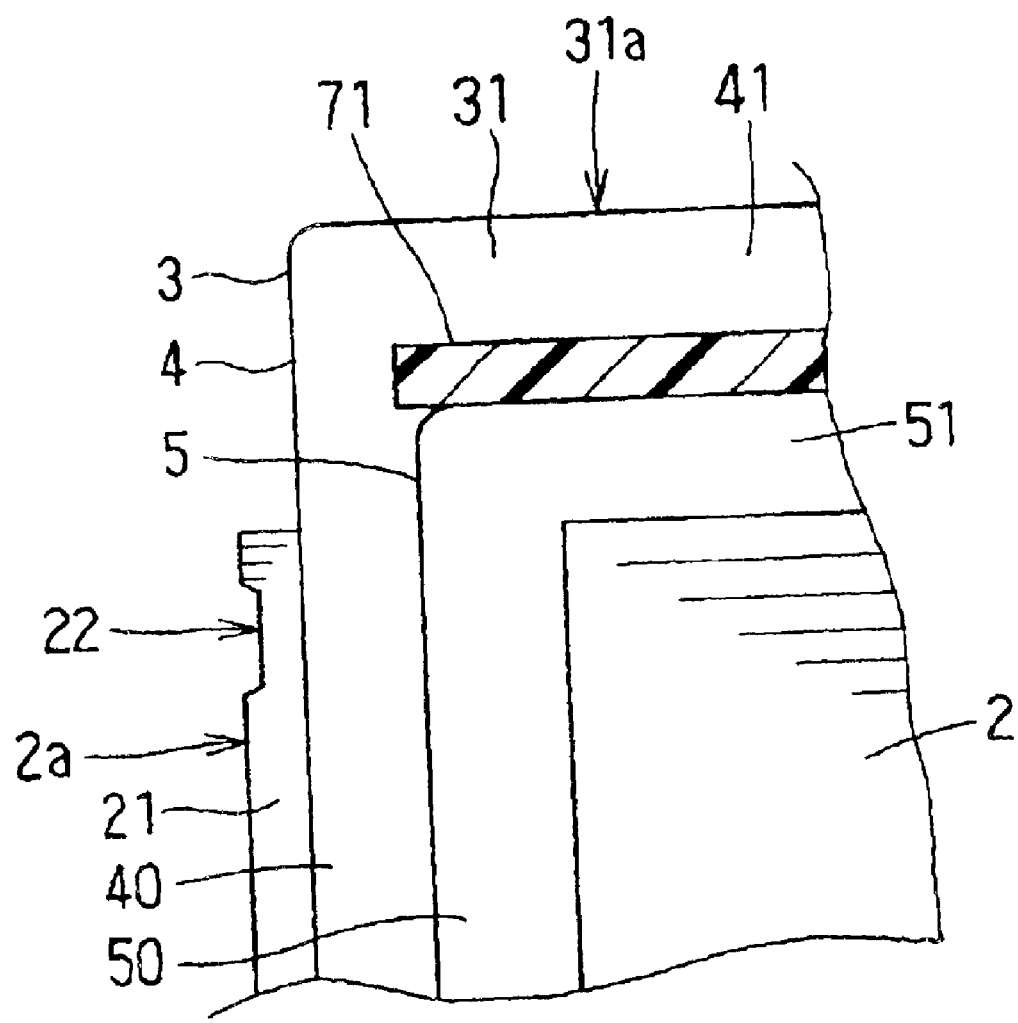
FIG. 3 is a an enlarged cross-sectional view illustrating the armature according to the first embodiment.

The armature core 2 is comprised of a plurality of laminated soft iron sheets having a common center hole to which the rotary shaft 1 is inserted and a plurality of slots 20, as shown in FIG. 2, at the peripheral portion thereof. The armature is assembled into a starter motor for a small automobile. The length and the outside diameter of the armature core 2 are, respectively, about 30 mm and 50 mm.

The armature coil 3 is comprised of a plurality of respectively connected upper conductor segments 4 and lower conductor segments 5 having in-slot portions 40 and 50 inserted into the slots 20 of the armature core 2. The armature coil 3 forms a commutator 31 adjacent an axial end of the armature core 2. In other words, a commutator end 41 has a disk-like commutator surface 31a on a plane that has the axis of the rotary shaft 1 as the normal line thereof, and a plurality of brushes are disposed to be in contact with the commutator surface 31a.

The in-slot portions 40 and 50 are covered with insulation paper sheets 6 and accommodated in the slots 20 of the armature core 2. The armature core 2 has a plurality of claw-shaped projections 21 that are bent to prevent the in-slot portions 40 and 50 from flying off the slots 20.

The upper and lower conductor segments 4 and 5, respectively, have commutator ends 41 and 51 welded to each other at one end of the in-slot portion 40 and 50 and coil ends 42 and 52 at the other end of the in-slot portion 40 and 50. The in-slot portion 40 of each upper conductor segment 4 is fitted to resinous insulation spacers 71 and 72 at opposite ends thereof to restrict the axial shift thereof. The opposite ends of the in-slot portions 40 of the upper conductor segments 4 fitted to the spacer 71 and 72 are disclosed in U.S. Pat. No. 5,739,617 or JP-A-9-51645. Because the opposite ends of the in-slot portions 40 of each upper conductor segment 4 are fitted to the spacer 71 and 72, the height difference is reduced at the opposite ends of the armature coil 3.

In Summary, the armature core 2 has the projections 21 that retain the conductor segments 4 and 5 in the slots 20 and a pressed portion 22 that anchors parts of the in-slot portions 40, 50 of conductor segments 4 and 5 to the armature core 2 more strongly than the rest of the in-slot portions.

After the armature is assembled and the outer surface 2a is formed cylindrical, the armature is rotated with the shaft 1 being supported. Then, a well-known roller (not shown) is pressed against a belt-like portion of the outer surface 2a of the armature core 2 near the commutator 31, thereby forming the pressed portion 22.

The pressed portion 22 has a diameter that is a size between 0.04 mm and 0.3 mm smaller than the rest of the armature core 2. In other words, the pressed portion 22 is a ratio between 0.08% and 0.6% smaller than the diameter of other portion of the armature core 2. The pressed portion 22 provides a sufficiently strong anchoring force that does not break the insulation paper sheets 6.

The pressed portion 22 is formed in a belt that is as wide as a few laminated sheets or about 3 mm on a portion of the armature core 2 at a space corresponding to at least a laminated sheet from the end of the armature core 2 adjacent to the commutator 31. However, the pressed portion 22 can be located in a half length of the armature core 2 from the end adjacent to the commutator 31. According to a test result, the insulation paper sheets 6 are not broken under the centrifugal force applied to the commutator's ends 41 and 51 of the upper-coil and lower-conductor segments 4 and 5. By the pressed portion 22, the in-slot portion 40 of the upper-conductor segments 4 can be securely fixed so that the shift caused by the thermal expansion can be controlled within a sufficiently narrow range.

Even if the conductor segments 4 or 5 thermally expand or contract, no shift is allowed relative to the armature core 2 at the pressed portion 22. Accordingly, the in-slot portions 40 and 50 of the conductor segments 4 and 5 thermally expand or contract in the opposite directions from the pressed portion 22 as the anchored portion.

Therefore, even if the rotary electric machine operates for a long time, the armature according to this embodiment does not have a problem of the unevenness of the commutator surface 31a. In fact, an operation test of the starter motor with the armature having the above sizes had been conducted, and the height difference on the commutator surface was measured by a concentric circle meter after it was disassembled. It was found that the maximum height difference was less than a few μm. In other words, the height difference of the commutator surface 31a is controlled less than one third or a quarter of the height difference 20 μm of the prior art armature.

Even if the conductor segments 4 and 5 thermally expand, whether or not the rotary electric machine operates, the conductor segments 4 and 5 should move the commutator surface 31a uniformly. Therefore, the height difference does not significantly appear on the commutator surface 31a.

An armature according to a first variation of the first embodiment has the uniform outside diameter and thicker projections 21 for anchoring the upper conductor segments at the anchoring portion than the rest.

Therefore, the performance of the rotary electric machine improves because the air gap between the stator and the armature core is reduced.

An armature according to a second variation of the first embodiment has narrower slot portions at the anchoring portion than the rest. Therefore, the upper conductor segments are fixed more tightly than the rest.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than a restrictive, sense.

What is claimed is:

1. An armature of a rotary electric machine, comprising:

a rotary shaft;

an armature core composed of a plurality of laminated sheets through which said shaft is inserted and a plurality of slots and projections at the outer periphery thereof;

an armature coil composed of a plurality of conductor segments having in-slot portions being respectively inserted into said slots; and a commutator formed by a portion of said armature coil to be integrated with said armature coil at an end thereof, wherein said armature core comprises a belt-like pressed anchoring portion disposed at a portion of said laminated sheets near said commutator for pressing a part of each of said in-slot portions that correspond to said portion of said laminated sheets to said armature core more strongly than other parts of said in-slot portions.

2. The armature according to claim 1, wherein aid anchoring portion is disposed at least at a distance less than half of the length of said armature core from an end thereof adjacent to said commutator.

3. The armature according to claim 2, wherein said anchoring portion is disposed at least a space corresponding to one of said laminated sheet apart from said end adjacent to said commutator.

4. The armature according to claim 1, wherein said pressed portion has an outside diameter 0.08%–0.6% less than the outside diameter of the rest of the said armature core.

5. A method for manufacturing an armature of a rotary electric machine, said method comprising:

producing an armature core composed of a plurality of laminated sheet through which a rotary shaft is inserted, said armature core comprising a plurality of slots at an outer periphery thereof;

inserting in-slot portions of an armature coil into said slots of the armature core; said armature coil being composed of a plurality of conductor segments; and forming a commutator integrated with said armature coil and formed at portions thereof;

wherein said armature core comprises an anchoring portion formed by pressing a portion of said laminated sheets near said commutator for anchoring a part of each of said in-slot portions that correspond to said portion of said laminated sheets to said armature core more strongly than other parts of said in-slot portions.

* * * * *